(12) United States Patent
Yamamoto

(10) Patent No.: US 7,478,666 B2
(45) Date of Patent: Jan. 20, 2009

(54) VEHICLE AIR CONDITIONER

(75) Inventor: Takeshi Yamamoto, Chiryu (JP)

(73) Assignee: Denso Corporation, Kariya (JP)

( * ) Notice: Subject to any disclaimer, the term of this patent is extended or adjusted under 35 U.S.C. 154(b) by 264 days.

(21) Appl. No.: 11/237,116

(22) Filed: Sep. 28, 2005

(65) Prior Publication Data

US 2006/0060342 A1 Mar. 23, 2006

(30) Foreign Application Priority Data

Dec. 12, 2003 (JP) ............................. 2003-415334

(51) Int. Cl.
*B60H 3/00* (2006.01)
(52) U.S. Cl. ........................... 165/42; 165/43; 165/204; 454/121
(58) Field of Classification Search ................ 62/324.6; 165/42, 43, 204; 454/121
See application file for complete search history.

(56) References Cited

U.S. PATENT DOCUMENTS

| | | | | |
|---|---|---|---|---|
| 5,876,277 A | * | 3/1999 | Uemura et al. | 454/139 |
| 5,899,262 A | * | 5/1999 | Yamaguchi et al. | 165/42 |
| 6,319,112 B2 | * | 11/2001 | Komowski | 454/139 |
| 2002/0139513 A1 | * | 10/2002 | Natsume et al. | 165/42 |

FOREIGN PATENT DOCUMENTS

| | | | |
|---|---|---|---|
| DE | 19748787 A1 | * | 5/1999 |
| JP | 2001287534 A | * | 10/2001 |
| JP | 2002120538 A | * | 4/2002 |
| JP | 2003154836 A | * | 5/2003 |
| JP | 2003170727 A | * | 6/2003 |
| JP | 2003182340 A | * | 7/2003 |
| JP | 2003191742 A | * | 7/2003 |
| JP | 2004-155263 | | 6/2004 |

* cited by examiner

*Primary Examiner*—Cheryl J Tyler
*Assistant Examiner*—Joseph Corrigan
(74) *Attorney, Agent, or Firm*—Harness, Dickey & Pierce, PLC

(57) ABSTRACT

In a vehicle air conditioner, a rotary door is disposed to open and close a foot opening portion and an inlet port of a face opening portion and a defroster opening portion. The rotary door includes a curvature outer peripheral portion for opening and closing the inlet port of the face opening portion and the foot opening portion, end plate portions located at two ends of the outer peripheral portion in an axial direction to open and close the foot opening portion, and shaft portions located at the end plate portions to be rotatably supported in the air conditioning case. The rotary door and the air conditioning case are provided such that a clearance between the inner wall of the air conditioning case and the outer peripheral portion of the rotary door is changed to be different between a bi-level air outlet mode and a foot/defroster air outlet mode.

9 Claims, 7 Drawing Sheets

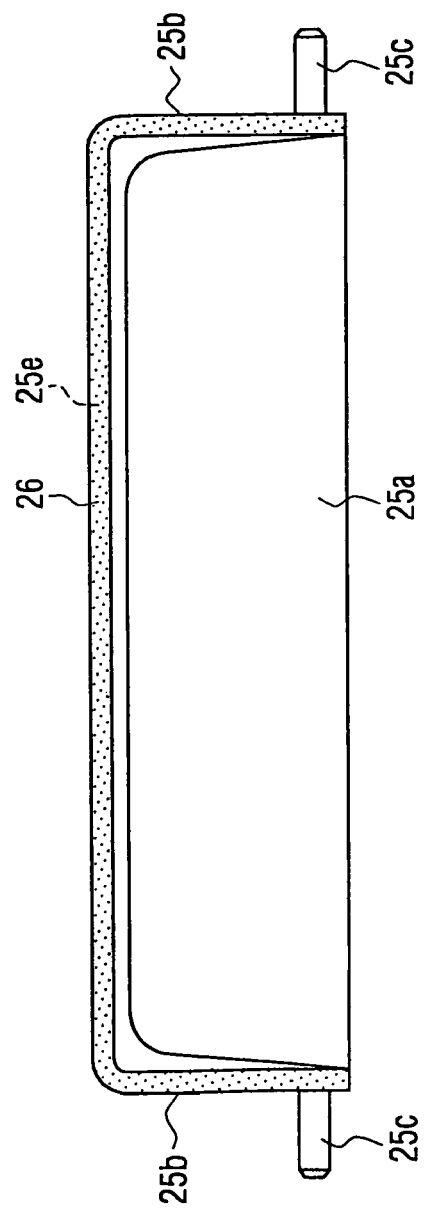
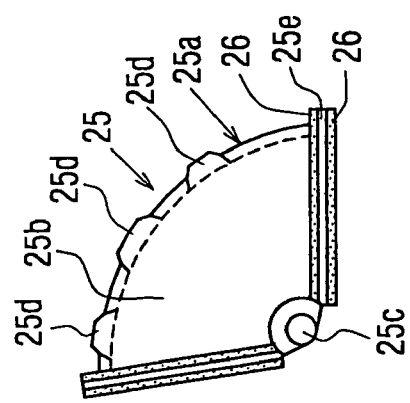
FIG. 2A
FIG. 2B

VEHICLE AIR CONDITIONER

CROSS REFERENCE TO RELATED APPLICATION

This application is based on Japanese Patent Application No. 2003-415334 filed on Dec. 12, 2003, the contents of which are incorporated herein by reference in its entirety.

FIELD OF THE INVENTION

The present invention relates to a vehicle air conditioner having an air conditioning case for forming an air passage through which conditioned air flows into air outlets opened at different portions in a passenger compartment. More particularly, the present invention relates to a switching door composed of a rotary door in the air conditioning case.

BACKGROUND OF THE INVENTION

A vehicle air conditioner shown in FIG. 7 includes an air conditioning case 100 for forming an air passage through which conditioned air (i.e., air having temperature-adjusted) flows into air outlets opened to plural positions in a passenger compartment. Specifically, a cooling heat exchanger 110 for cooling air and a heating heat exchanger 120 for heating air are arranged in the air conditioning case 100. Further, the air conditioning case 100 has foot opening portions 130 communicating with foot air outlets from which conditioned air is blown toward the foot area of a passenger in the passenger compartment, a face opening portion 140 communicating with face air outlets from which conditioned air is blown toward the face area of the passenger in the passenger compartment, and a defroster opening portion 150 communicating with defroster air outlets from which conditioned air is blown toward an inner surface of a windshield of the vehicle. Here, the foot opening portions 130 are provided in side walls of the air conditioning case 10 at a downstream air position of an air mixing portion.

A foot door 160 composed of a rotary door is rotatably located in the air conditioning case 100 between the foot opening portion 130 and an inlet port of the defroster opening portion 140 and the face opening portion 150, and a defroster/face door 170 composed of a rotary door is rotatably located in the air conditioning case 100 to open and close the face opening portion 140 and the defroster opening portion 150. The defroster/face door 170 is located downstream of the foot door 160.

The foot door 160 is constructed with an outer peripheral portion 160a formed into a curvature shape, two end plate portions 160b provided at two ends of the outer peripheral portion 160a in an axial direction, and a shaft portion 160c formed at each end plate portion 160b. The end plate portions 160b slide along open surfaces of the foot opening portions 130 of the side walls to open and close the foot opening portion 130. Further, the shaft portion 160c is rotatably located in the air conditioning case 100.

Rotation positions of the doors 16, 17 are changed in accordance with air outlet modes. For example, FIG. 7 shows a bi-level air outlet mode in which both the foot opening portions 130 and the face opening portion 140 are opened by the doors 160, 170, and the defroster opening portion 150 is closed by the door 170. In the bi-level air outlet mode, conditioned cool air is blown toward the face area of the passenger from the face air outlets, and conditioned warm air is blown toward the foot area of the passenger from the foot air outlets.

When the foot door 160 is rotated fully in the arrow "a" direction in FIG. 7, a face air outlet mode is set. During the face air outlet mode, the foot opening portions 130 are fully closed, and only the face opening portion 140 is opened. When the foot door 160 is rotated fully in the arrow "b" direction in FIG. 7, a foot air outlet mode is set. During the foot air outlet mode, the inlet port communicating with the face opening portion 140 and the defroster opening portion 150 is closed, and only the foot opening portions 130 are fully opened. Further, when the defroster/face door 170 is fully rotated in the arrow "c" in FIG. 7 while the foot door 160 is rotated to fully close the foot opening portions 130, a defroster mode where only the defroster opening portion 150 is opened is set. Furthermore, when a defroster/foot air outlet mode is set, the foot door 160 is rotated from the state of the defroster air outlet mode, so that both the defroster opening portion 150 and the foot opening portions 130 are opened.

As described above, in the bi-level air outlet mode and the foot/defroster air outlet mode, the foot door 160 is rotated at a position (a middle position) between the fully closing position of the foot opening portion 130 and the fully opening position of the foot opening portion 130. When the foot door 160 is rotated at a middle position, a clearance is formed between an inner wall of the air conditioning case 100 and the outer peripheral portion 160a of the foot door 160. In this case, cool air or warm air immediately after passing through the heat exchanger 110, 120 before being mixed flows into the clearance. Therefore, the temperature of air to be blown into the face opening portion 140 or the defroster opening portion 150 may be not adjusted to a predetermined temperature.

For example, if cool air from the cooling heat exchanger 110 flows into the clearance when the bi-level air outlet mode is set, cool air having a low temperature may be directly introduced into the face air outlet through the clearance, and comfortable property for the passenger is deteriorated. Further, if a seal member is provided on the inner wall of the air conditioning case 100 to seal the clearance with the outer peripheral portion 160a, a sliding resistance of the foot door 160 is greatly increased, and driving power of an actuator such as a servomotor for driving the foot door 160 is increased.

SUMMARY OF THE INVENTION

In view of the above-described problems, it is an object of the present invention to provide an air conditioner for a vehicle, which can accurately obtain predetermined air temperatures in accordance with air outlets, without increasing slide resistance.

It is another object of the present invention to provide an air conditioner for a vehicle, which can change a clearance between an outer peripheral portion of a, rotary door and an inner wall of an air conditioning case in accordance with a rotation position of the rotary door.

According to an aspect of the present invention, an air conditioner for a vehicle includes an air conditioning case for defining an air passage through which air flows into a passenger compartment of the vehicle. The air conditioning case has first, second and third opening portions through which air is blown toward first, second and third portions in the passenger compartment, and an air mixing portion in which cool air and warm air are mixed at an upstream side of the first, second and third opening portions. A heat exchanger is disposed at an upstream air side of the air mixing portion in the air conditioning case, for cooling or heating air to be blown into the first, second and third opening portions. Further, a rotary door is disposed in the air mixing portion of the air conditioning case. The rotary door includes a curvature outer peripheral portion for opening and closing an inlet passage of the second opening portion and the third opening portion, an end plate portion located at two ends of the outer peripheral portion in an axial direction to open and close the first opening portion, and a shaft portion located at the end plate portion to be rotatably supported in the air conditioning case.

In the air conditioner, the air conditioning case and the rotary door are constructed such that a clearance between an inner wall of the air conditioning case and the outer peripheral portion of the rotary door is changed to be different between a first air outlet mode where both the first opening portion and the second opening portion are opened, and a second air outlet mode where both the first opening portion and the third opening portion are opened. Accordingly, it is possible to control an amount of air flowing into the second or third opening portion through the clearance, in accordance with the first or second air outlet mode.

For example, the outer peripheral portion of the rotary door has an uneven surface which is uneven in a circumferential direction of the rotary door, and the inner wall of the air conditioning case, opposite to the outer peripheral portion of the rotary door, is made uneven in a rotation direction of the rotary door. Accordingly, when a protruding portion of the rotary door and a protruding portion of the air conditioning case correspond to each other, the clearance between the outer peripheral portion of the rotary door and the inner wall of the air conditioning case can be made smallest. In contrast, when the protruding portion of the rotary door corresponds to a recess portion of the air conditioning case, the clearance between the outer peripheral portion of the rotary door and the inner wall of the air conditioning case can be made maximum. Accordingly, this clearance can be readily changed between the first and second air outlets modes without increasing a sliding resistance of the rotary door.

For example, the first opening portion is a foot opening portion communicating with a foot air outlet from which air is blown toward a lower side in the passenger compartment, the second opening portion is a face opening portion communicating with a face air outlet from which air is blown toward an upper side in the passenger compartment, and the third opening portion is a defroster opening portion communicating with a defroster air outlet from which air is blown toward an inner surface of a windshield of the vehicle.

BRIEF DESCRIPTION OF THE DRAWINGS

The above and other objects, features and advantages of the present invention will become more apparent from the following detailed description of preferred embodiments made with reference to the accompanying drawings, in which:

FIGS. 2A and 2B are a front view and a side view showing a foot door according to the embodiment;

DETAILED DESCRIPTION OF PREFERRED EMBODIMENTS

Figure 1:
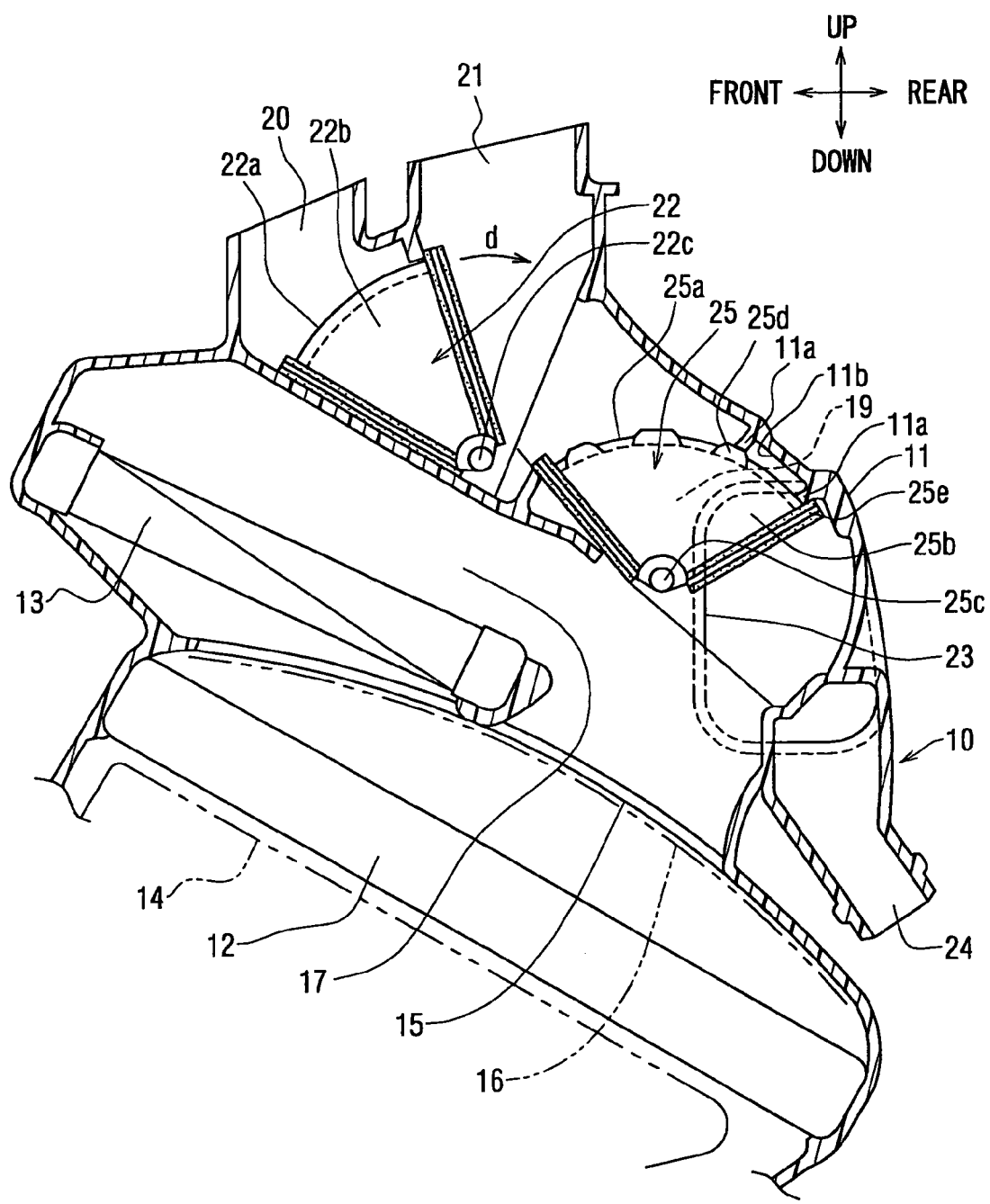
FIG. 1 is a schematic sectional view of an air conditioning unit of a vehicle air conditioner in a foot air outlet mode, according to an embodiment of the present invention.

A preferred embodiment of the present invention will be now described with reference to FIGS. 1 to 6. An air conditioner for a vehicle includes a blower unit (not shown) and an air conditioning unit 10 shown in FIG. 1. As an example, the air conditioning unit 10 is located in a passenger compartment under a dashboard at an approximate center position in a vehicle right-left direction (vehicle width direction), and the blower unit is located to be offset from the center portion to a front passenger's side in the vehicle right-left direction.

The blower unit includes an inside/outside air switching box for selectively introducing inside air (i.e., air inside the passenger compartment) or outside air (i.e., air outside the passenger compartment), and a blower for blowing air introduced from the inside/outside air switching box.

The air conditioning unit 10 includes an evaporator 12 (i.e., cooling heat exchanger) for cooling air, and a heater core 13 (i.e., heating heat exchanger) for heating air, which are disposed in an air conditioning case 11 for forming an air passage. The air conditioning case 11 is made of a resin such as polypropylene, having a predetermined elasticity and a sufficient strength. In this embodiment, the air conditioning case 11 is divided into plural division case parts, and the plural division case parts are integrally connected by a fastening member such as metal spring clips and screws after the heat exchangers 12, 13 and the other members such as doors are disposed.

The air conditioning unit 10 is mounted on the vehicle to be arranged as shown in FIG. 1 in a vehicle front-rear direction and a vehicle up-down direction. The blower unit is disposed so that air is blown into an air inlet portion 14 at an upstream side of the evaporator 12.

The evaporator 12 is disposed in the air conditioning case 11 at a position immediately after the air inlet portion 14. The evaporator 12 is disposed and slanted in the air conditioning case 11 to cross an entire sectional area of the air passage in the air conditioning case 11, such that a wall thickness of the evaporator 12 is thin in the vehicle up-down direction when the air conditioning unit 10 is mounted to the vehicle. Therefore, air blown from the blower flows into a bottom surface of the evaporator 12 extending in the vehicle front-rear direction. The evaporator 12 cools air passing therethrough by absorbing evaporation latent heat of refrigerant in a refrigerant cycle from air. Therefore, air passing through the evaporator 12 is cooled.

A heater core 13 is arranged at a downstream air side (vehicle upper side) of the evaporator 12 to have a predetermined distance therebetween. The evaporator 12 is slanted downwardly from a vehicle front side to a vehicle rear side. The heater core 13 is located in the air conditioning case 11 at a vehicle front side area of the evaporator 12 to be slanted downwardly from the vehicle front side to the vehicle rear side. The heater core 13 is arranged to heat air after passing through the evaporator 12. The heater core 13 heats air using hot water (e.g., engine cooling water) flowing therein as a heat source.

A cool air bypass passage 15 through which cool air from the evaporator 12 bypasses the heater core 13 is formed at a rear position of the heater core 13 within the air conditioning case 11. A warm air passage 17 through which warm air after passing through the heater core 13 flows is formed in the air conditioning case 11. An air mixing door 16 composed of a film door is disposed to open and close the cool air bypass passage 15 and an inlet passage of the heater core 13. Therefore, the air mixing door 16 adjusts a mixing ratio between cool air flowing through the cool air bypass passage 15 and warm air heated in the heater core 13. The air mixing door 16 slides along a guide portion formed in the cool air bypass passage 15 and the inlet passage of the heater core 13. The air mixing door 16 is driven by an actuator such as a motor of a temperature control mechanism. Accordingly, the temperature of air (conditioned air) to be blown into the passenger compartment is controlled by the air mixing door 16.

An air mixing portion 19, in which cool air from the cool air bypass passage 15 and warm air from the warm air passage 17 of the heater core 13 are mixed, is provided in the air conditioning case 11 at a downstream air portion of the cool air bypass passage 15 and the warm air passage 17.

A defroster opening portion 20 is formed in an upper portion of the air conditioning case 11 at a front side position. The defroster opening portion 20 is provided at a downstream side from the air mixing portion 19 so that conditioned air having been temperature-adjusted flows into the defroster opening portion 20. The defroster opening portion 20 is connected to defroster air outlets by a defroster duct, so that conditioned air from the defroster opening portion 20 is blown toward the inner surface of a windshield from the defroster air outlets.

A face opening portion 21 is opened in the upper portion of the air conditioning case 11 at a vehicle rear side of the defroster opening portion 20 adjacent to the defroster opening portion 20. The face opening portion 21 is provided at a downstream position of the air mixing portion 19 so that conditioned air from the air mixing portion 19 flows into the face opening portion 21. The face opening portion 21 is connected to face air outlets by a face duct, so that conditioned air is blown toward the upper portion of a passenger in the passenger compartment from the face air outlets.

The defroster opening portion 20 and the face opening portion 21 are opened and closed by a defroster/face door 22 composed of a rotary door, which is rotatably disposed in the air conditioning case 11 at an upstream air side of the defroster opening portion 20 and the face opening portion 21. The defroster/face door 22 is a rotary door constructed with a curvature outer peripheral portion 22a, and fan-shaped end plate portions 22b at two ends of the outer peripheral portions 22a in an axial direction, and axial portions 22c provided at the end plate portions 22b. The axial portions 22c are rotatably supported at side walls of the air conditioning case 11. When the defroster/face door 22 is rotated to the position in FIG. 1, the face opening portion 21 is opened, and the defroster opening portion 20 is closed. In contrast, when the defroster/face door 22 is rotated to the arrow "d" direction in FIG. 1, the defroster opening portion 20 is opened.

A foot opening (e.g., two foot opening portions) 23 is provided for blowing air to the foot area of the passenger in the passenger compartment. The foot opening portions 23 can be opened and closed by a foot door 25. For example, the foot opening portions 23 are formed in side walls of the air conditioning case 11, so that conditioned air from the air mixing portion 19 flows into the foot opening portions 23. The foot opening portions 23 are connected to right and left foot air outlets by a foot duct, thereby the conditioned air is blown toward the lower portions of right and left front seat in the passenger compartment.

Further, the foot opening portions 23 communicate with rear foot opening portions 24 formed in the air conditioning case 11. The rear foot opening portion 24 is connected to rear foot air outlets through a rear foot duct, so that conditioned air is blown toward the foot area of a passenger on the rear seat in the passenger compartment.

The foot opening portion 23 is opened and closed by a foot door 25 composed of a rotary door. The foot door 25 is disposed rotatably in the air conditioning case 11 at an upstream air side of the foot opening portion 23 to cross with the air mixing portion 19. When the foot opening portions 23 are fully opened by the foot door 25, the foot door 25 is rotated to the rotation position shown in FIG. 1. In this case, a communication passage of the air mixing portion 19, communicating with the defroster opening portion 20 and the face opening portion 21 is closed (shut). That is, an inlet port of the defroster opening portion 20 and the face opening portion 21 is closed.

Figure 6:
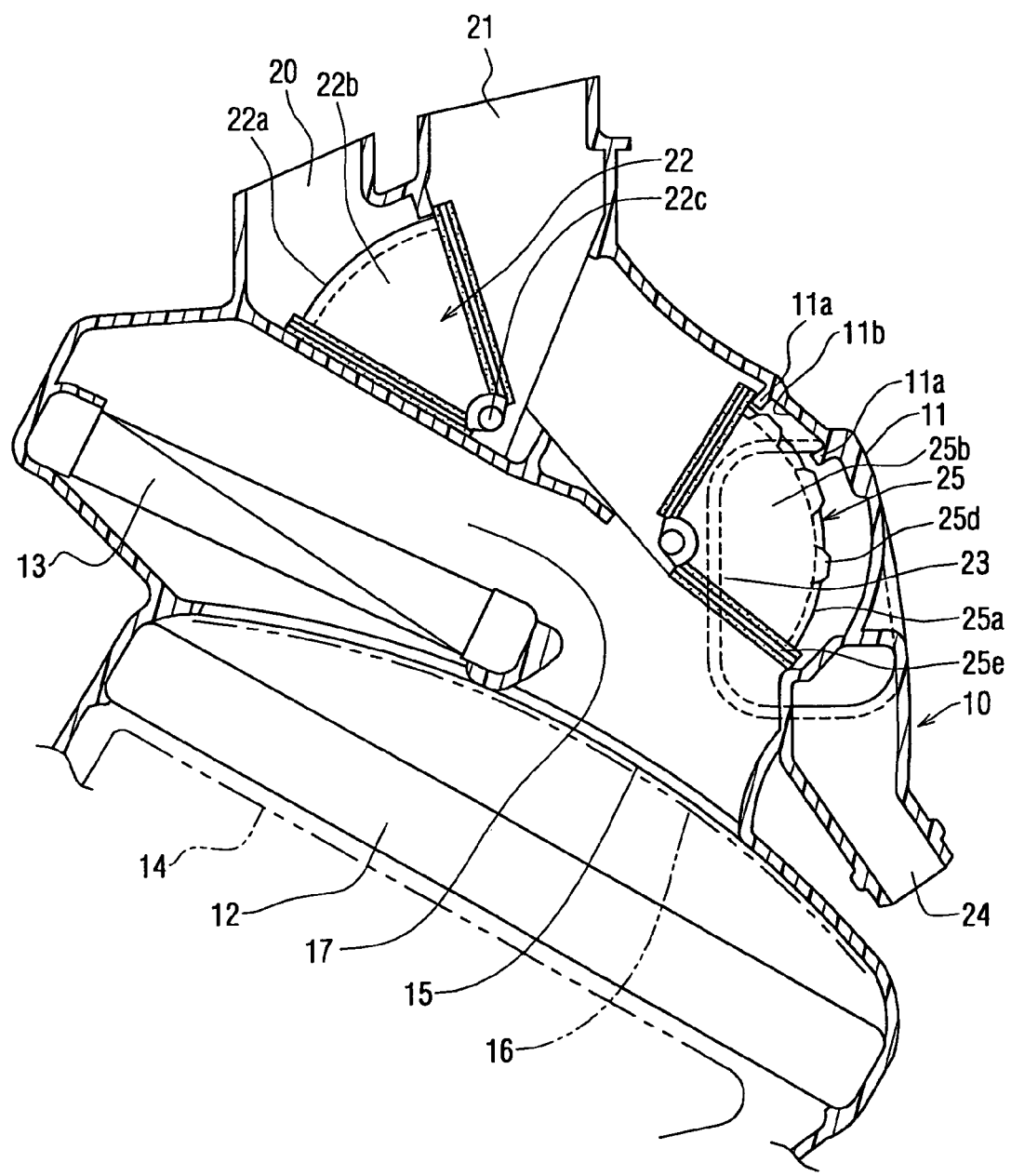
FIG. 6 is a schematic sectional view showing door rotation positions in a face air outlet mode of the air conditioning unit according to the embodiment.
Figure 7:
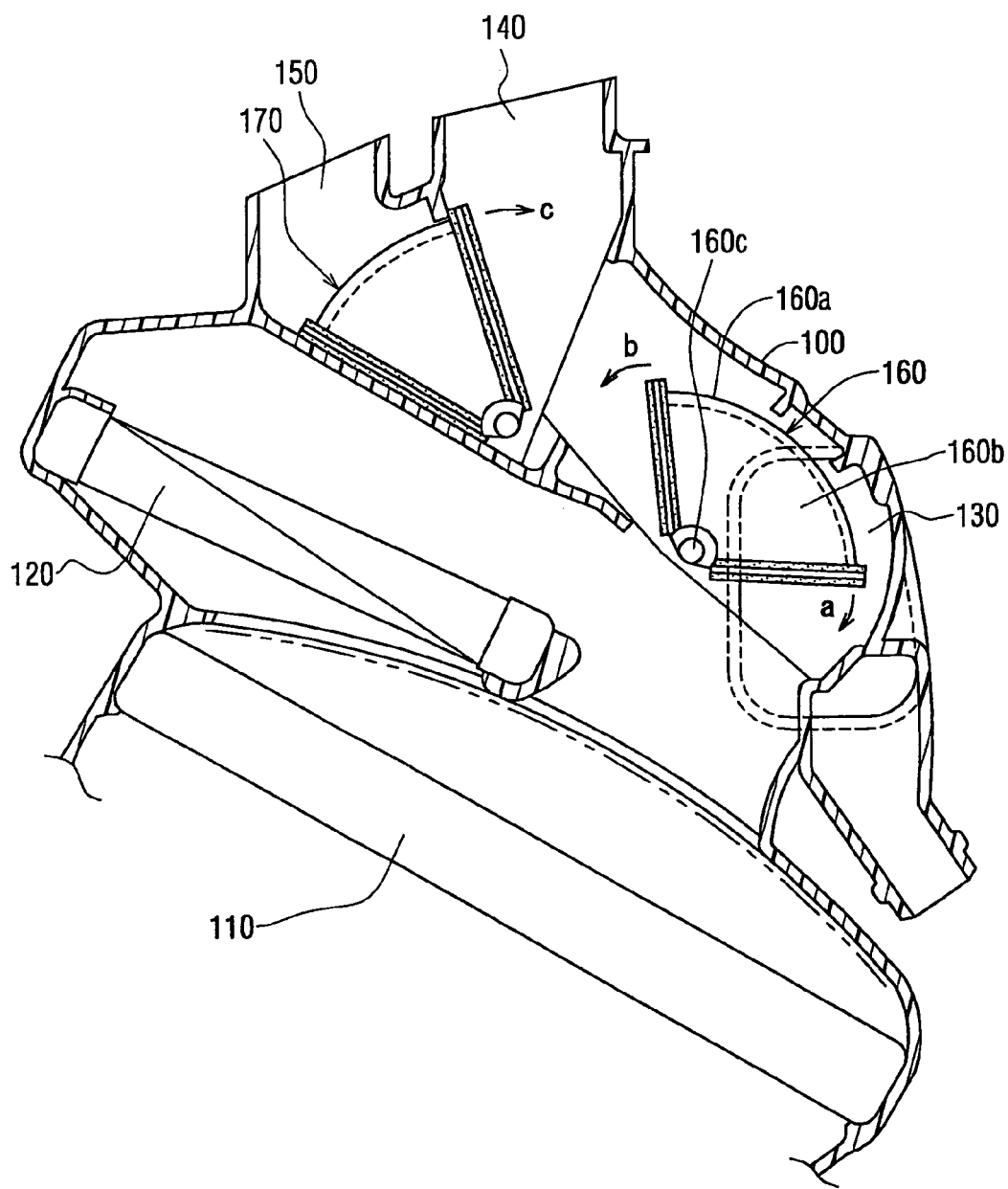
FIG. 7 is a schematic sectional view showing an air conditioning unit of a vehicle air conditioner in a related art.

When the foot opening portions 23 are fully closed by the foot door 25, the foot door 25 is rotated to the rotation position shown in FIG. 6. At this time, the communication passage of the air mixing portion 19 communicating with the defroster opening portion 20 and the face opening portion 21 is fully opened.

As shown in FIGS. 2A and 2B, the foot door 25 is a rotary door constructed with a curvature outer peripheral portion 25a positioned between two flange end portions in a circumferential direction, end plate portions provided at two ends of the outer peripheral portion 25a in an axial direction, and shaft portions 25c provided at the end plate portions 25b. While the foot door 25 is rotated, the curvature outer peripheral portion 25a slides along an open surface of the air mixing portion 19, and the end plate portions 25b slide along open surfaces of the foot opening portions 23. As shown in FIG. 2B, the foot door 25 has approximately a fan shape in cross section.

A seal member 26 composed of a packing material is provided on two surfaces of the flange portion 25e. When the foot opening portion 23 is fully opened or fully closed, the seal member 26 of the foot door 26 press-contacts a seal surface (not shown) formed on the air conditioning case 11. As shown in FIG. 2, plural protrusion portions 25d (e.g., three) protruding radially outwardly relative to a circumferential surface are formed on the outer peripheral portion 25a to extend in an elongated direction of the outer peripheral portion 25a. That is, because the protrusion portions 25d are formed on the outer peripheral portion 25a, the outer peripheral portion 25a is uneven in a circumferential direction.

In contrast, the inner wall of the air conditioning case 11, opposite to the uneven portion of the outer peripheral portion 25a of the foot door 25, is also provided with a protruding portions 11a and a concave portion 11b between both the protruding portions 11a. That is, an uneven portion constructed with the protruding portions 11a and the concave portion 11b is provided on the inner wall of the air conditioning case 11 to be uneven in the rotation direction of the foot door 25.

In this embodiment, a clearance dimension between the inner wall of the air conditioning case 11 and the outer peripheral portion 25a of the foot door 25 is formed to be changed in accordance with the rotation position of the foot door 25. For example, the clearance dimension is set different due to the rotation positions of the foot door 25, between a bi-level air outlet mode (first air outlet mode) where both the foot opening portions 23 and the face opening portion 21 are opened, and a foot/defroster air outlet mode (second air outlet mode) where both the foot opening portions 23 and the defroster opening portion 20 are opened.

One surface of the protruding portion 11a formed on the inner wall of the air conditioning case 11 is used as a seal surface which air-tightly contacts the seal member 26 of the foot door 25 when the foot door 25 is positioned in a fully closing state or a fully opening state of the foot opening portion 23. In this embodiment, the defroster/face door 22 and the foot door 25 are used as a switching door for switching and setting an air outlet mode.

One end portion of the shaft portions 22c rotatably supported in the air conditioning case 11 protrudes to an outer portion of the air conditioning case 11, and is operatively linked with an air outlet mode switching mechanism (e.g., an actuator such as servomotor) via a link mechanism (not shown). Similarly, one end portion of the shaft portions 25c rotatably supported in the air conditioning case 11 protrudes to an outer portion of the air conditioning case 11, and is operatively linked with the air outlet mode switching mechanism (e.g., an actuator such as servomotor) via the link mechanism (not shown). Therefore, the doors 22 and 25 can be operatively linked with each other.

Next, operation of the air conditioner according to this embodiment will be now described. The air conditioner is provided with an electronic control unit (not shown) into which operation signals from various operation members provided on an air conditioning operation panel and sensor signals from various sensors are input. The rotation positions of the defroster/face door 22 and the foot door 25 are controlled based on the control signals from the control unit.

A flow ratio between cool air cooled by the evaporator 12 and flowing directly from the cool air bypass passage 15 and warm air heated in the heater core 13 is adjusted by the air mixing door 16, so that the temperature of air to be blown into the passenger compartment is adjusted. That is, the cool air from the cool air bypass passage 15 and the warm air from the warm air passage 17 of the heater core 13 are mixed in the air mixing portion 19, so that conditioned air is obtained.

FIG. 1 shows a foot air outlet mode in which the face opening portion 21 and the defroster opening portion 20 are closed by the foot door 25, and the foot opening portions 23 are opened by the foot door 25.

Even in the foot air outlet mode shown in FIG. 1, the temperature of air to be blown into the passenger compartment can be adjusted to a suitable temperature by the air mixing door 16. Therefore, in the foot air outlet mode, conditioned air having a suitable temperature can be blown toward the foot area of a passenger in the passenger compartment through the foot opening portions 23.

Figure 3:
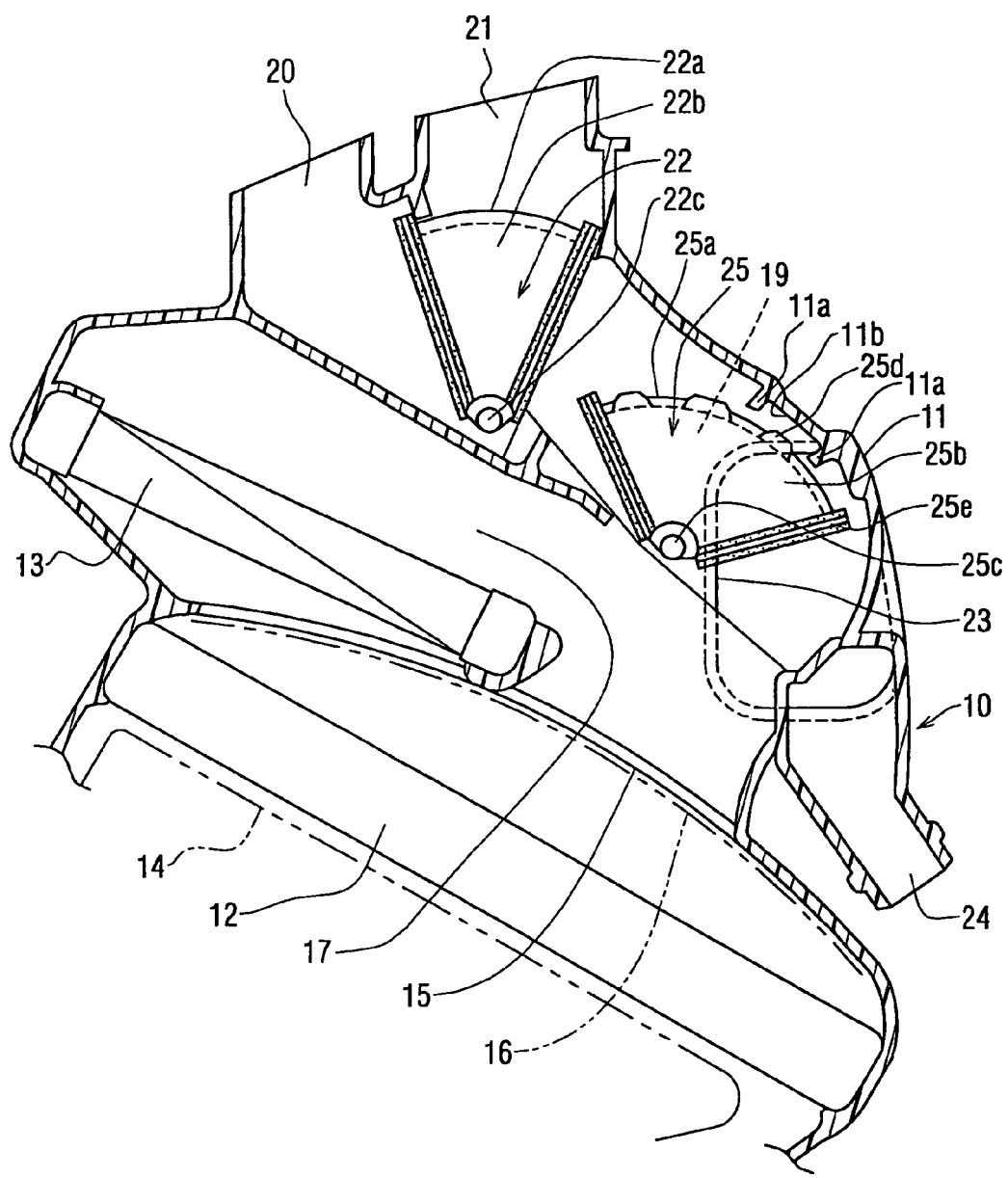
FIG. 3 is a schematic sectional view showing door rotation positions in a foot air outlet mode of the air conditioning unit according to the embodiment.

In the foot air outlet mode shown in FIG. 1, only the foot opening portions 23 are opened so that all air is blown from the foot air outlets. However, in the foot air outlet mode, the defroster opening portion 20 can be slightly opened so that air blown from both the defroster opening portion 20 and the foot opening portion 23. For example, during the foot air outlet mode, a flow amount of air blown from the foot air outlets can be set approximately at 80%, and a flow amount of air blown from the defroster air outlet can be set approximately at 20%. As shown in FIG. 3, the foot door 25 is rotated to slightly open the inlet passage of the defroster opening portion 20 and the face opening portion 21, and the defroster/face door 22 is rotated to close the face opening portion 21 and to fully open the defroster opening portion 20.

In the foot air outlet mode shown in FIG. 3, a protruding portion 25d (first protruding portion) positioned at one side (foot opening side) in the rotation direction is located in a middle portion of the concave portion 11b of the air conditioning case 11. Accordingly, in the foot air outlet mode shown in FIG. 3, about 80% of air is blown from the foot air outlets toward the foot area of a passenger in the passenger compartment, and about 20% of air is blown from the defroster air outlets toward the inner surface of the windshield. In the foot air outlet mode of FIG. 3, the flange portion 25e is separated from the seal surface of the inner wall of the air conditioning case 11, a clearance is formed between the outer peripheral portion 25a of the foot door 25 and the inner wall of the air conditioning case 11.

That is, the first protruding portion 25d formed on the outer peripheral portion 25a is shifted from the protruding portion 11a of the inner wall of the air conditioning case 11, the clearance dimension between the inner wall of the air conditioning case 11 and the outer peripheral portion 25a of the foot door 25 becomes larger. Thus, warm air flowing from the warm air passage 17 before being mixed can flow into the clearance along the inner wall of the air conditioning case 11. In this case, high-temperature air flows from the clearance toward the defroster opening portion 20, and the temperature of air blown from the defroster air outlets toward the inner surface of the windshields can be increased.

Figure 4:
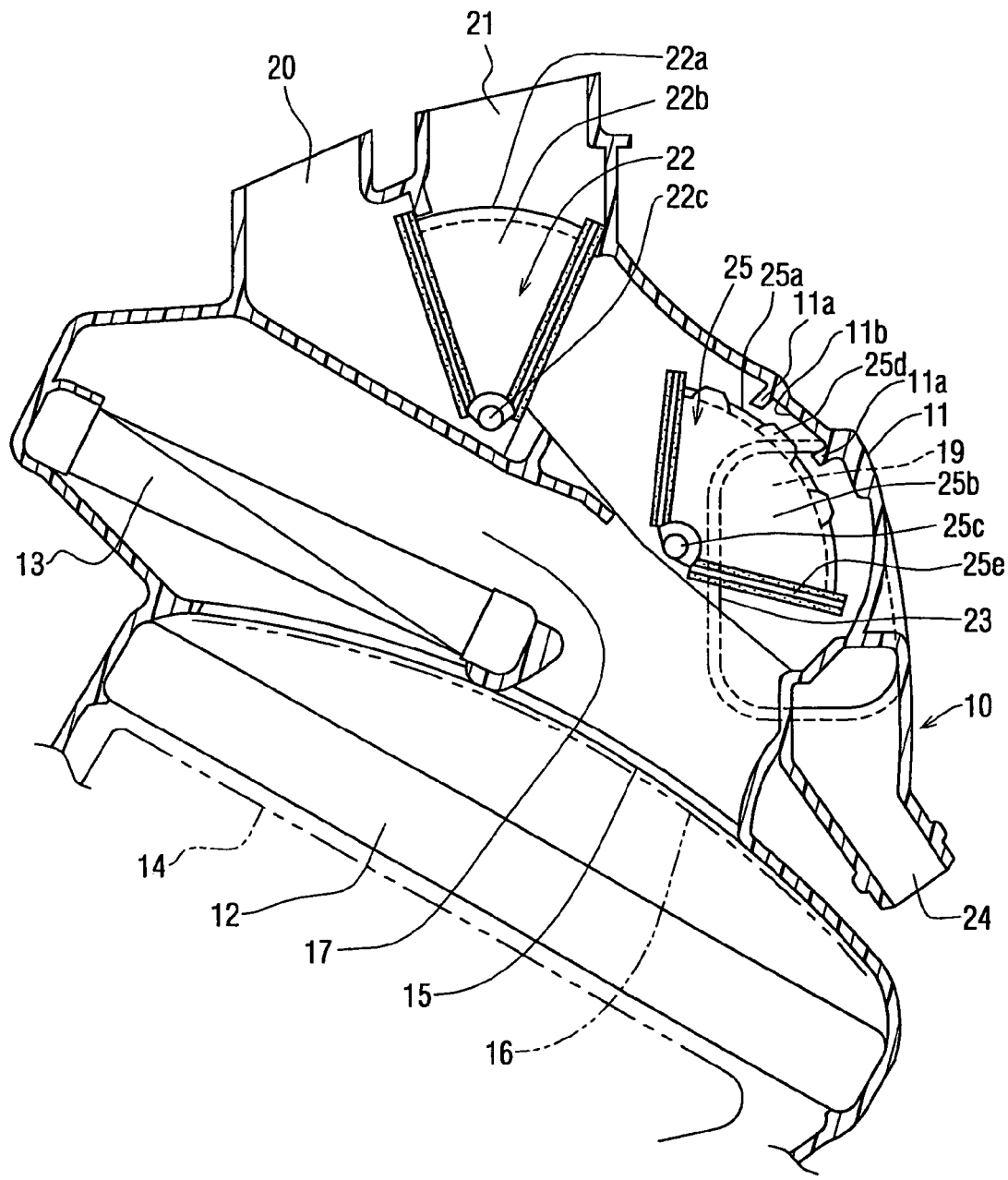
FIG. 4 is a schematic sectional view showing door rotation positions in a foot/defroster air outlet mode of the air conditioning unit according to the embodiment.

A foot/defroster air outlet mode shown in FIG. 4 is set when the air amount blown from the defroster air outlets is made larger than that in the foot air outlet mode shown in FIG. 3. In the foot/defroster air outlet mode shown in FIG. 4, air is blown from the defroster air outlets by a flow amount about 50%, and air is blown from the foot air outlets by a flow amount about 50%. That is, a flow ratio between an air amount from the foot air outlet and an air amount from the defroster air amount can be set approximately at 1. In the foot/defroster air outlet mode shown in FIG. 4, a second protruding portion 25d adjacent to the first protruding portion 25d in the foot door 25 is positioned in a middle portion of the concave portion 11b of the inner wall of the air conditioning case 11.

Because the foot door 25 is rotated such that the second protruding portion 25d of the foot door 25 is positioned in the middle portion of the concave portion 11b of the inner wall of the air conditioning case 11, the flow ratio between the air amount from the foot air outlets and the air amount from the defroster air outlets can be readily set approximately at 1 (50%/50%). Because the clearance is formed between the outer peripheral portion 25a of the foot door 25 and the inner wall of the air conditioning case 11, the temperature of air to be blown into the inner surface of the windshield can be increased because warm air before being mixed is introduced into the defroster opening portion 20 through the clearance between the outer peripheral portion 25a of the foot door 25.

Figure 5:
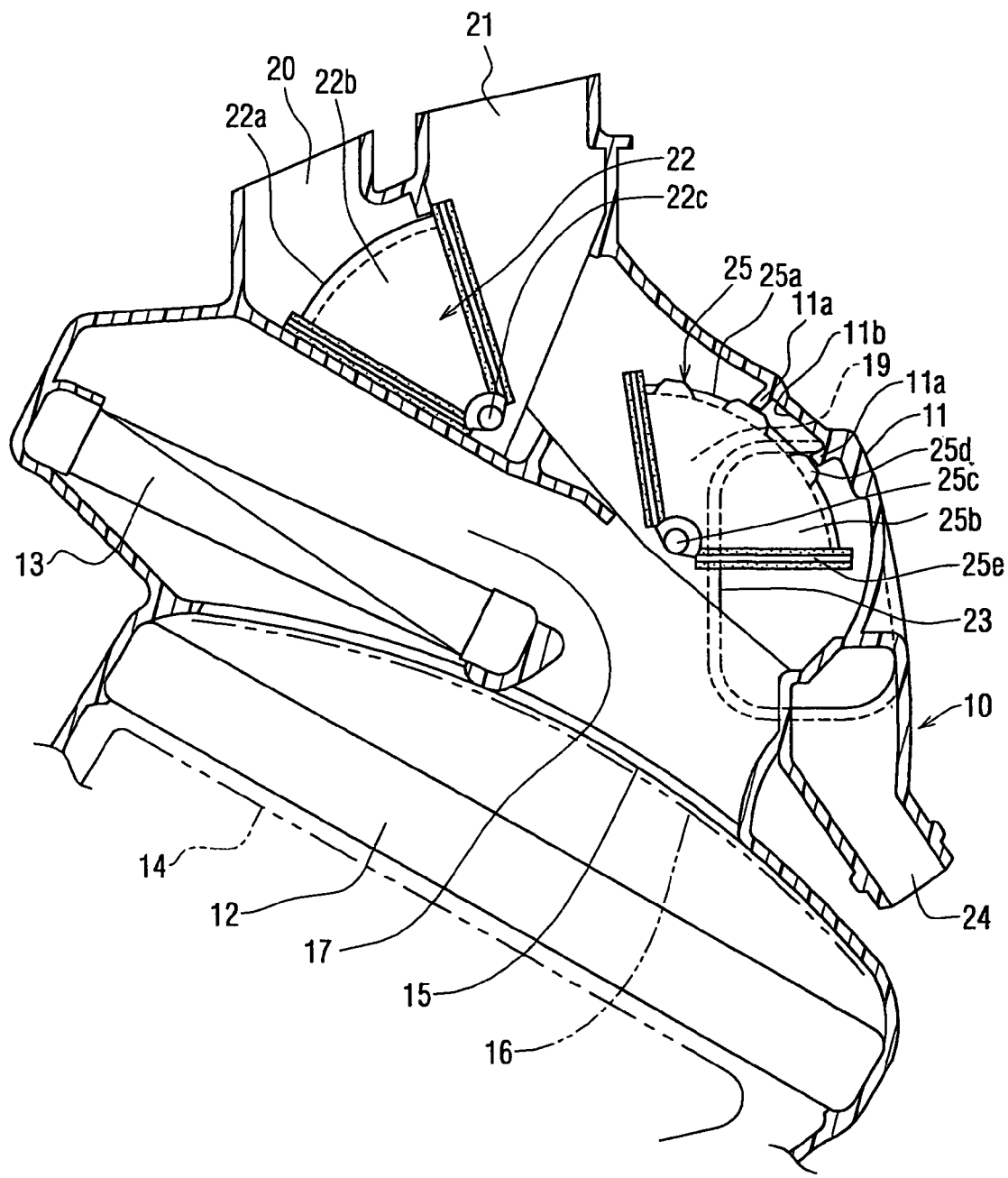
FIG. 5 is a schematic sectional view showing door rotation positions in a bi-level air outlet mode of the air conditioning unit according to the embodiment.

When a bi-level air outlet mode shown in FIG. 5 is set, cool air can be blown from the face air outlets and warm air can be blown from the foot air outlets. When the bi-level air outlet mode shown in FIG. 5 is set, the rotation position of the foot door 25 is controlled such that both the first and second protruding portions 25d of the outer peripheral portion 25a are positioned at both the protruding portions 11a of the air conditioning case 11. For example, in the bi-level air outlet mode, both the protruding portion 25d approximately contact both the protruding portions 11a of the air conditioning case 11. In this case, a clearance between the outer peripheral portion 25a of the foot door 25 and the inner wall of the air conditioning case 11 can be made almost zero. Furthermore, the rotation position of the defroster/face door 22 is controlled so that the face opening portion 21 is fully opened and the defroster opening 20 is fully closed. Accordingly, the flow ratio between an air amount blown from the face air outlet and an air amount blown from the foot air outlets can be set approximately at 50%/50%. During the bi-level air outlet mode, air is blown toward the upper portion of the passenger through the face opening portion 21 while air is blown toward the lower portion of the passenger through the foot opening portions 23.

In the bi-level air outlet mode shown in FIG. 5, because both the protruding portions 25d of the rotary door 25 are rotated at positions corresponding to both the protruding portions 11a of the air conditioning case 11, the clearance through which air flows can be made extremely small, and no cool air from the cool air bypass passage 15 before mixed flows through the clearance along the inner wall of the air conditioning case 11. Therefore, conditioned air having a suitable temperature flows toward the face opening portion 21 while it can restrict cool air before being mixed from flowing into the face opening portion 21.

When a face air outlet mode shown in FIG. 6 is set, the foot door 25 is rotated to fully close the foot opening portions 23 and fully open the communication passage communicating with the face opening portion 21 and the defroster opening portion 20. Furthermore, the defroster/face door 22 is rotated to fully open the face opening portion 21 and fully close the defroster opening portion 20. Therefore, all conditioned air is blown from the face air outlets toward the upper side in the passenger compartment.

According to the vehicle air conditioner of this embodiment, the foot door 25 and the inner wall of the air conditioning case 11 are constructed such that the clearance between the outer peripheral portion 25a of the foot door 25 and the inner wall of the air conditioning case 11 is set to be different from each other between the bi-level air outlet mode and the defroster/face air outlet mode.

In the bi-level air outlet mode where the foot door 25 is rotated to open both the foot opening portions 23 and the face opening portion 21, the rotation position of the foot door 25 is controlled so that the clearance becomes almost zero. Therefore, cool air before being mixed is restricted from being introduced into the face opening portion 21 from the clearance along the inner wall of the air conditioning case 11. Accordingly, during the bi-level air outlet mode, conditioned air having a suitable temperature can be introduced into the face opening portion 21, while conditioned air having a suitable temperature can be introduced into the foot opening portion 23.

In the foot/defroster air outlet mode, the foot door 25 is rotated so that the clearance between the outer peripheral portion 25a and the inner wall of the air conditioning case 11 becomes largest. Therefore, warm air before being mixed is introduced into the defroster opening portion 20 through the increased clearance, and the temperature of air blown toward the inner wall surface of the windshield from the defroster air outlets can be increased in the foot/defroster air outlet mode. Thus, in the foot/defroster air outlet mode, the defogging property of the windshield can be effectively improved.

According to this embodiment, the uneven portion constructed with the protruding portions 25d and the recess portion between the protruding portions 25d is formed on the outer peripheral portion 25a of the foot door 25 to be uneven in the circumferential direction. Furthermore, the uneven portion is also formed on the inner wall of the air conditioning case 11, opposite to the outer peripheral portion 25a of the foot door 25, to be uneven in the rotating direction of the foot door 25. Therefore, when the protruding portion 25d of the foot door 25 is positioned at the same position as the protruding portion 11a of the air conditioning case 11 in the rotation direction of the foot door 25, a clearance between the protruding portion 25d of the foot door 25 and the protruding portion 11a becomes smallest (e.g., almost zero). In contrast, when the protruding portion 25d of the foot door 25 is positioned in the concave portion 11b of the air conditioning case 11 in the rotation direction of the foot door 25, the clearance between the outer peripheral portion 25a of the foot door 25 and the protruding portions 11a becomes largest. Accordingly, in the bi-level air outlet mode and the foot/defroster air outlet mode, the clearance between the inner wall of the air conditioning case 11 and the outer peripheral portion 25a of the foot door 25 can be suitably changed without increasing a sliding resistance of the foot door 25.

According to this embodiment, in the bi-level air outlet mode where both the foot opening portions 23 and the face opening portion 21 are opened, the rotation position of the foot door 25 is controlled so that the clearance becomes almost zero. Therefore, cool air before being mixed is restricted from being introduced into the face opening portion 21 through the clearance along the inner wall of the air conditioning case 11. Accordingly, during the bi-level air outlet mode, conditioned air having a suitable temperature can be introduced into the face opening portion 21, while conditioned air having a suitable temperature can be introduced into the foot opening portions 23.

In the foot/defroster air outlet mode where both the foot opening portions 23 and the defroster opening portion 20 are opened, the foot door 25 is rotated so that the clearance between the outer peripheral portion 25a and the inner wall of the air conditioning case 11 becomes largest. Therefore, warm air before being mixed is introduced into the defroster opening portion 20 through the clearance, and the temperature of air blown toward the inner wall surface of the windshield from the defroster air outlets can be increased in the foot/defroster air outlet mode. Thus, in the foot/defroster air outlet mode, the defogging property of the windshield can be effectively improved.

Other Embodiments

Although the present invention has been described in connection with some preferred embodiments thereof with reference to the accompanying drawings, it is to be noted that various changes and modifications will become apparent to those skilled in the art.

For example, in the above-described embodiment, the foot opening portions 23 are used as a first opening portion of the present invention, the face opening portion 21 is used as a second opening portion of the present invention, and the defroster opening portion 20 is used as a third opening portion of the present invention. However, the face opening portion 21 can be used as the first opening portion of the present invention, and the foot opening portions 22 can be used as the second opening portion of the present invention. Further, in the above-described embodiment, the defroster/face door 22 is constructed with a rotary door, however, can be constructed with a plate door, for example.

In the above-described embodiment, the one surfaces of the protruding portions 11a formed on the inner wall of the air conditioning case 11 are used as a part of the seal surfaces which air-tightly contact the seal member 26 of the foot door 25 in the fully closing state and the fully opening state of the foot opening portion 23. However, the seal member 26 of the foot door 25 can air-tightly contact a seal surface of a protruding portion separately formed from the protruding portions 11a.

In the above-described embodiment, two protruding portions 11a are formed. However, the number of the protruding portions 11a is not limited to two, and can be suitably changed. Further, the flow ratio of the air amount can be suitably changed without being limited to the examples described in the above embodiment.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An air conditioner for a vehicle comprising:
an air conditioning case for defining an air passage through which air flows into a passenger compartment of the vehicle, wherein the air conditioning case has first, second and third opening portions from which air is blown toward first, second and third portions in the passenger compartment, and an air mixing portion in which air is mixed at an upstream side of the first, second and third opening portions;
a heat exchanger disposed at an upstream air side of the air mixing portion, in the air conditioning case for cooling or heating air to be blown into the first, second and third opening portions;
a first rotary door disposed in the air mixing portion; and
a single door member different from the first rotary door for opening and closing the defroster opening portion and for opening and closing the face opening portion; wherein
the first rotary door includes a curvature outer peripheral portion for opening and closing an inlet passage of the second opening portion and the third opening portion, an end plate portion located at two ends of the outer peripheral portion in an axial direction to open and close the first opening portion, a shaft portion located at the end plate portion to be rotatably supported in the air conditioning case;
the air conditioning case and the first rotary door are constructed such that a clearance between an inner wall of the air conditioning case and the outer peripheral portion of the first rotary door is changed to be different between a first air outlet mode where both the first opening portion and the second opening portion are opened, and a second air outlet mode where both the first opening portion and the third opening portion are opened;
the outer peripheral portion has an uneven surface which is uneven in a circumferential direction of the first rotary door;
the inner wall of the air conditioning case, opposite to the outer peripheral portion of the first rotary door, is made uneven in a rotation direction of the first rotary door;
the first opening portion is a foot opening portion communicating with a foot air outlet from which air is blown toward a lower side in the passenger compartment;
the second opening portion is a face opening portion communicating with a face air outlet from which air is blown toward an upper side in the passenger compartment;
the third opening portion is a defroster opening portion communicating with a defroster air outlet from which air is blown toward an inner surface of a windshield of the vehicle;
the first air outlet mode is a bi-level air outlet mode where both the foot opening portion and the face opening portion are opened;
the second air outlet mode is a foot/defroster air outlet mode where both the foot opening portion and the defroster opening portion are opened;
the uneven surface of the outer peripheral portion of the rotary door faces the uneven portion of the inner wall of the air conditioning case in both the bi-level air outlet mode and in the foot/defroster air outlet mode; and
a clearance between the uneven surface of the rotary door and the uneven portion of the inner wall of the air conditioning case is smaller in the bi-level air outlet mode than the clearance between the uneven surface of the rotary door and the uneven portion of the inner wall of the air conditioning case in the foot/defroster mode.

2. The air conditioner according to claim 1, wherein:
the first rotary door is rotated at a position where the clearance between the inner wall of the air conditioning case and the outer peripheral portion of the first rotary door becomes smallest when the first air outlet mode is set.

3. The air conditioner according to claim 2, wherein:
the first rotary door is rotated at a position where the clearance between the inner wall of the air conditioning case and the outer peripheral portion of the first rotary door becomes maximum when the second air outlet mode is set.

4. The air conditioner according to claim 1,
wherein the single door member is operatively linked with the first rotary door.

5. The air conditioner according to claim 1, wherein:
the outer peripheral portion of the first rotary door has a protruding portion protruding radially outside;
the air conditioning case has a protruding portion protruding from an inner wall opposite to the outer peripheral portion of the first rotary door;
in the first air outlet mode, a first radial clearance is defined between the protruding portion of the first rotary door and the protruding portion of the air conditioning case; and
in the second air outlet mode, a second radial clearance different from the first radial clearance is defined between the protruding portion of the first rotary door and the air conditioning case at a position spaced from the protruding portion of the air conditioning case.

6. An air conditioner for a vehicle comprising:
an air conditioning case for defining an air passage through which air flows into a passenger compartment of the vehicle, wherein the air conditioning case has first, second and third opening portions from which air is blown toward first, second and third portions in the passenger compartment, and an air mixing portion in which air is mixed at an upstream side of the first, second and third opening portions;
a heat exchanger disposed at an upstream air side of the air mixing portion, in the air conditioning case for cooling or heating air to be blown into the first, second and third opening portions;
a first rotary door disposed in the air mixing portion; and
second rotary door located downstream from the first rotary door, the second rotary door including an end plate located at two ends of a curved outer peripheral portion of the second rotary door; wherein
the first rotary door includes a curvature outer peripheral portion for opening and closing an inlet passage of the second opening portion and the third opening portion, an end plate portion located at two ends of the outer peripheral portion in an axial direction to open and close the first opening portion, a shaft portion located at the end plate portion to be rotatably supported in the air conditioning case;

the air conditioning case and the first rotary door are constructed such that a clearance between an inner wall of the air conditioning case and the outer peripheral portion of the first rotary door is changed to be different between a first air outlet mode where both the first opening portion and the second opening portion are opened, and a second air outlet mode where both the first opening portion and the third opening portion are opened;

the outer peripheral portion has an uneven surface which is uneven in a circumferential direction of the first rotary door;

the inner wall of the air conditioning case, opposite to the outer peripheral portion of the first rotary door, is made uneven in a rotation direction of the first rotary door;

the first opening portion is a foot opening portion communicating with a foot air outlet from which air is blown toward a lower side in the passenger compartment;

the second opening portion is a face opening portion communicating with a face air outlet from which air is blown toward an upper side in the passenger compartment;

the third opening portion is a defroster opening portion communicating with a defroster air outlet from which air is blown toward an inner surface of a windshield of the vehicle;

the first air outlet mode is a bi-level air outlet mode where both the foot opening portion and the face opening portion are opened;

the second air outlet mode is a foot/defroster air outlet mode where both the foot opening portion and the defroster opening portion are opened:

the uneven surface of the outer peripheral portion of the rotary door faces the uneven portion of the inner wail of the air conditioning case in both the bi-level air outlet mode and in the foot/defroster air outlet mode; and a clearance between the uneven surface of the rotary door and the uneven portion of the inner wail of the air conditioning case is smaller in the bi-level air outlet mode than the clearance between the uneven surface of the rotary door and the uneven portion of the inner wall of the air conditioning case in the foot/defroster mode.

7. An air conditioner for a vehicle comprising:

an air conditioning case for defining an air passage through which air flows into a passenger compartment of the vehicle, wherein the air conditioning case has first, second and third opening portions from which air is blown toward first, second and third portions in the passenger compartment, and an air mixing portion in which air is mixed at an upstream side of the first, second and third opening portions;

a heat exchanger disposed at an upstream air side of the air mixing portion, in the air conditioning case for cooling or heating air to be blown into the first, second and third opening portions; and a first rotary door disposed in the air mixing portion, wherein:

the first rotary door includes a curvature outer peripheral portion for opening and closing an inlet passage of the second opening portion and the third opening portion, an end plate portion located at two ends of the outer peripheral portion in an axial direction to open and close the first opening portion, a shaft portion located at the end plate portion to be rotatably supported in the air conditioning case;

the air conditioning case and the first rotary door are constructed such that a clearance between an inner wall of the air conditioning case and the outer peripheral portion of the first rotary door is changed to be different between a first air outlet mode where both the first opening portion and the second opening portion are opened, and a second air outlet mode where both the first opening portion and the third opening portion are opened;

the outer peripheral portion has an uneven surface which is uneven in a circumferential direction of the first rotary door;

the inner wall of the air conditioning case, opposite to the outer peripheral portion of the first rotary door, is made uneven in a rotation direction of the first rotary door;

the first opening portion is a foot opening portion communicating with a foot air outlet from which air is blown toward a lower side in the passenger compartment;

the second opening portion is a face opening portion communicating with a face air outlet from which air is blown toward an upper side in the passenger compartment;

the third opening portion is a defroster opening portion communicating with a defroster air outlet from which air is blown toward an inner surface of a windshield of the vehicle;

the first air outlet mode is a bi-level air outlet mode where both the foot opening portion and the face opening portion are opened;

the second air outlet mode is a foot/defroster air outlet mode where both the foot opening portion and the defroster opening portion are opened;

the uneven surface of the outer peripheral portion of the rotary door faces the uneven portion of the inner wall of the air conditioning case in both the bi-level air outlet mode and in the foot/defroster air outlet mode;

a clearance between the uneven surface of the rotary door and the uneven portion of the inner wall of the air conditioning case is smaller in the bi-level air outlet mode than the clearance between the uneven surface of the rotary door and the uneven portion of the inner wall of the air conditioning case in the foot/defroster mode; and the outer peripheral portion of the first rotary door has a protruding portion protruding radially outside;

the air conditioning case has a protruding portion protruding from an inner wall opposite to the outer peripheral portion of the first rotary door;

in the first air outlet mode, a first radial clearance is defined between the protruding portion of the first rotary door and the protruding portion of the air conditioning case;

in the second air outlet mode, a second radial clearance different from the first radial clearance is defined between the protruding portion of the first rotary door and the air conditioning case at a position spaced from the protruding portion of the air conditioning case;

the protruding portion of the first rotary door has first and second protruding ribs having a recess portion between the first and second protruding ribs in a rotation direction of the first rotary door;

the protruding portion of the air conditioning case has first and second protruding ribs having a recess portion therebetween in the rotation direction;

in the first air outlet mode, the first and second protruding ribs of the first rotary door are positioned to correspond to the first and second protruding ribs of the air conditioning case, respectively to define the first radial clearance; and in the second air outlet mode, the first and second protruding ribs of the first rotary door are placed at positions offset from the first and second protruding ribs of the air conditioning case to define the second radial clearance.

8. An air conditioner for a vehicle comprising:

an air conditioning case for defining an air passage through which air flows into a passenger compartment of the vehicle, wherein the air conditioning case has first, second and third opening portions from which air is blown toward first, second and third portions in the passenger compartment, and an air mixing portion in which air is mixed at an upstream side of the first, second and third opening portions;

a heat exchanger disposed at an upstream air side of the air mixing portion, in the air conditioning case for cooling or heating air to be blown into the first, second and third opening portions; and a first rotary door disposed in the air mixing portion, wherein:

the first rotary door includes a curvature outer peripheral portion for opening and closing an inlet passage of the second opening portion and the third opening portion, an end plate portion located at two ends of the outer peripheral portion in an axial direction to open and close the first opening portion, a shaft portion located at the end plate portion to be rotatably supported in the air conditioning case;

the air conditioning case and the first rotary door are constructed such that a clearance between an inner wall of the air conditioning case and the outer peripheral portion of the first rotary door is chanced to be different between a first air outlet mode where both the first opening portion and the second opening portion are opened, and a second air outlet mode where both the first opening portion and the third opening portion are opened;

the outer peripheral portion has an uneven surface which is uneven in a circumferential direction of the first rotary door;

the inner wall of the air conditioning case, opposite to the outer peripheral portion of the first rotary door, is made uneven in a rotation direction of the first rotary door;

the first opening portion is a foot opening portion communicating with a foot air outlet from which air is blown toward a lower side in the passenger compartment;

the second opening portion is a face opening portion communicating with a face air outlet from which air is blown toward an upper side in the passenger compartment;

the third opening portion is a defroster opening portion communicating with a defroster air outlet from which air is blown toward an inner surface of a windshield of the vehicle;

the first air outlet mode is a bi-level air outlet mode where both the foot opening portion and the face opening portion are opened;

the second air outlet mode is a foot/defroster air outlet mode where both the foot opening portion and the defroster opening portion are opened;

the uneven surface of the outer peripheral portion of the rotary door faces the uneven portion of the inner wall of the air conditioning case in both the bi-level air outlet mode and in the foot/defroster air outlet mode;

a clearance between the uneven surface of the rotary door and the uneven portion of the inner wall of the air conditioning case is smaller in the bi-level air outlet mode than the clearance between the uneven surface of the rotary door and the uneven portion of the inner wall of the air conditioning case in the foot/defroster mode; and the first rotary door is movable to a third air outlet mode where the first rotary door fully closes the second and third opening portions and fully opens the first opening portion.

9. An air conditioner for a vehicle comprising:

an air conditioning case for defining an air passage through which air flows into a passenger compartment of the vehicle, wherein the air conditioning case has first, second and third opening portions from which air is blown toward first, second and third portions in the passenger compartment, and an air mixing portion in which air is mixed at an upstream side of the first, second and third opening portions;

a heat exchanger disposed at an upstream air side of the air mixing portion, in the air conditioning case for cooling or heating air to be blown into the first, second and third opening portions; and a rotary door disposed in the air mixing portion, wherein:

the rotary door includes a curvature outer peripheral portion for opening and closing an inlet passage of the second opening portion and the third opening portion, an end plate portion located at two ends of the outer peripheral portion in an axial direction to open and close the first opening portion, a shaft portion located at the end plate portion to be rotatably supported in the air conditioning case;

the air conditioning case and the rotary door are constructed such that a clearance between an inner wall of the air conditioning case and the outer peripheral portion of the rotary door is changed to be different between a first air outlet mode where both the first opening portion and the second opening portion are opened, and a second air outlet mode where both the first opening portion and the third opening portion are opened; and the rotary door is movable to a third air outlet mode where the rotary door fully closes the second and third opening portions and fully opens the first opening portion.

* * * * *